US007529388B2

(12) United States Patent
Brown et al.

(10) Patent No.: US 7,529,388 B2
(45) Date of Patent: *May 5, 2009

(54) METHODS FOR AUTOMATICALLY TRACKING MOVING ENTITIES ENTERING AND EXITING A SPECIFIED REGION

(75) Inventors: Lisa Marie Brown, Pleasantville, NY (US); Arun Hampapur, Norwalk, CT (US); Andrew William Senior, New York, NY (US); Ying Li Tian, Yorktown Heights, NY (US); Senem Velipasalar, Princeton, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/115,186

(22) Filed: May 5, 2008

(65) Prior Publication Data
US 2008/0205703 A1   Aug. 28, 2008

Related U.S. Application Data

(63) Continuation of application No. 11/140,193, filed on May 27, 2005, now Pat. No. 7,409,076.

(51) Int. Cl.
*G06K 9/00* (2006.01)
*H04N 5/225* (2006.01)
(52) U.S. Cl. ........................ 382/103; 348/169; 348/172
(58) Field of Classification Search ................. 382/103; 348/169, 170, 172
See application file for complete search history.

(56) References Cited

U.S. PATENT DOCUMENTS 6,263,088 B1 * 7/2001 Crabtree et al. ............. 382/103

2003/0107649 A1 * 6/2003 Flickner et al. ............. 348/169

FOREIGN PATENT DOCUMENTS

WO    WO-03044737 A1 * 5/2003

OTHER PUBLICATIONS

Chen et al., "An Automatic Bi-Directional Passing People Counting Method Based on Color Image Processing", IEEE, pp. 200-207.*
K. Hashimoto et al., "People Count System Using Multi-Sensing Application," International Conference on Solid-State Sensors and Actuators, pp. 1291-1294, Jun. 1997.
K. Terada et al., "A Method of Counting the Passing People by Using the Stereo Images," Proceedings of IEEE International Conference on Image Proc., pp. 338-342, Oct. 1999.

(Continued)

*Primary Examiner*—Samir A. Ahmed
*Assistant Examiner*—Pierre Diverse
(74) *Attorney, Agent, or Firm*—Ryan, Mason & Lewis, LLP

(57) ABSTRACT

Techniques for tracking entities using a single overhead camera are provided. A foreground region is detected in a video frame of the single overhead camera corresponding to one or more entities. It is determined if the foreground region is associated with an existing tracker. It is determined whether the detected foreground region is the result of at least one of a merger of two or more smaller foreground regions having corresponding existing trackers and a split of a larger foreground region having a corresponding existing tracker when the detected foreground region is not associated with an existing tracker. The detected foreground region is tracked via at least one existing tracker when the foreground region is associated with an existing tracker or the foreground region is the result of at least one of a merger and a split.

14 Claims, 12 Drawing Sheets

OTHER PUBLICATIONS

D. Beymer, "Person Counting Using Stereo," Proc. of Workshop on Hununi Motion, pp. 127-133, Dec. 2000.

V. Kettnaker et al., "Counting People from Multiple Cameras," IEEE International Conference on Multimedia Computing and Systems, vol. 2, pp. 267-271, Jul. 1999.

D.B. Yang et al., "Counting People in Crowds with a Real-Time Network of Simple Image Sensors," Proceedings of the Ninth IEEE International Conference on Computer Vision (ICCV'03), pp. 1-8, Oct. 2003.

T-H. Chen et al., "An Automatic Bi-Directional Passing-People Counting Method Based on Color Image Processing," IEEE International Carnahan Conf. on Security Technology, pp. 200-207, Oct. 2003.

C. Stauffer et al., "Adaptive Background Mixture Models for Real-Time Tracking," IEEE International Conference on Computer Vision and Pattern Recognition (CVPR), 7 pages, 1999.

D. Comaniciu et al., "Real-Time Tracking on Non-Rigid Objects Using Mean Shift," IEEE Conference on Computer Vision and Pattern Recognition (CVPR'00), 8 pages, 2000.

* cited by examiner

A – FRAME 803

C – FRAME 804

E – FRAME 808

B – FRAME 803

D – FRAME 804

F – FRAME 808

METHODS FOR AUTOMATICALLY TRACKING MOVING ENTITIES ENTERING AND EXITING A SPECIFIED REGION

CROSS-REFERENCE TO RELATED APPLICATION(S)

This application is a continuation of U.S. application Ser. No. 11/140,193 filed on May 27, 2005, the disclosure of which is incorporated herein by reference.

FIELD OF THE INVENTION

The present invention relates generally to techniques for monitoring the movement of entities through a specified region and, more particularly, for tracking people entering and exiting a region of interest for counting purposes using a single overhead camera, and capable of managing image mergers and splits.

BACKGROUND OF THE INVENTION

There is an ever increasing demand for automatic, efficient and reliable means for tracking and counting entities, particularly people, which enter or exit a specified region. Shopping malls and supermarkets may utilize this information to examine hourly people traffic patterns and distribution. This examination allows for an optimization of labor scheduling, as well as a determination of the effectiveness of promotional events and store displays. In addition, the traffic and distribution information is very important for security purposes, as it assists in assigning an accurate number of security workers to key areas, as well as in designing efficient evacuation plans.

The existing approaches for tracking and counting people may be classified into three broad categories: systems using contact-type counters, such as, for example, turnstiles at a gate; systems using sensors, such as, for example, infrared beams and heat sensors; and vision-based systems using cameras.

Systems using contact-type counters, such as turnstiles, can count people only one at a time. Turnstiles obstruct the passageway, and cause congestion if there is high-density traffic. In addition, they have the limitation of possible undercounting, since it is possible for two people to pass through a turnstile in a single rotation of the bar.

Systems using infrared beams or heat sensors do not block passageways and do not affect the passing people to the extent that contact-type counters do. However, they suffer from the same limitation of undercounting, since it is difficult for these systems to successfully resolve multiple people. For example, when an infrared beam is interrupted, multiple people may be entering the region simultaneously. Counting systems have been introduced that use thermal images obtained by multi-infrared sensors, see, for example, K. Hashimoto et al., "People Count System Using Multi-Sensing Application," Int'l Conf. on Solid-State Sensors and Actuators, Vol. 2, pp. 1291-1294, June 1997. People are detected by taking the difference between the measured output and the mean output for the floor. The sensing system is valid if the temperature difference is more than 0.4° C. However, errors may be caused in these thermal image systems simply by large movements of person's arms or legs.

Image-based systems have been introduced as an alternative to the systems mentioned above. Earlier attempts at image-based systems were successful for situations having scarce people traffic, but encountered limitations when the traffic density became high or when a large number of image mergers occurred, as it was difficult to resolve groups of people.

In order to deal with multiple people in the specified region, a method using an overhead stereo camera has been introduced, see, for example, K. Terada et al., "A Method of Counting the Passing People by Using the Stereo Images," Proc. of IEEE Int'l Conf. on Image Proc., Vol. 2, pp. 338-42, October 1999. Two measurement lines are set on the floor to detect the direction of the movement. Space-time images at the measurement lines are generated for images, and template matching is applied to these images in order to find the corresponding image coordinates of the same point, thereby obtaining a 3D location of the point. The number of people is determined by counting the number of groups of points in the space-time image. The method performs adequately with multiple people in the camera view as long as people move separately. However, it does not perform adequately with groups of people moving together or with images of people merging into a single group of points.

Additional approaches using an overhead stereo camera have also been introduced; see, for example, D. Beymer, "Person Counting Using Stereo," Proc. of Workshop on Hununi Motion, pp. 127-133, December 2000. After applying real-time stereo and 3D reconstruction, the scene is segmented by selecting stereo pixels falling in a 3D volume of interest (VOI). These pixels are then remapped to an orthographic view termed an occupancy map and people in this map are tracked using a Gaussian mixture model and Kalman filtering. By selecting the VOI, only heads and torsos of people are tracked, which avoids the counting of shopping carts and small children, for example. Although the system has the advantage of estimating object heights, this requires a calibrated stereo camera head and eliminates the flexibility of using a single ordinary camera. Moreover, the calibration of the stereo head requires some expert intervention and can make the system installation cumbersome.

Cameras with non-overlapping fields of view have also been used; see, for example, V. Kettnaker et al., "Counting People from Multiple Cameras," IEEE Int'l Conf. on Multimedia Computing and Systems, Vol. 2, pp. 267-271, June 1999. The observations of people by different cameras are linked so that they show the same person, and this is achieved by combining visual appearance matching with mutual content constraint between cameras. However, the system assumes that the floor topology is known, that people walk with a steady speed, and that there is only one person per observation interval. Two people walking together can cause problems for the system, since they cannot be resolved.

A network of cameras may also be utilized in the tracking and counting of people, see, for example, D. B. Yang et al., "Counting People in Crowds with a Real-Time Network of Simple Image Sensors," Proc. of IEEE Int'l Conf. on Computer Vision, pp. 122-129, October 2003, where the projection of a visual hull, which is a set of polygons, is computed from silhouettes of foreground objects. Upper and lower bounds are projected on the number of objects in each polygon. These bounds are updated as objects move and their history is recorded in a tree. While the method provides an idea about the number of people in the scene and their possible locations, it does not track the people individually.

A people counting system using a single camera has been introduced, which tracks people by analyzing their HSI histogram and uses a box-based corner coordinate checking process to manage image mergers and splits, see, for example, T-H. Chen et al., "An Automatic Bi-Directional Passing-People Counting Method Based on Color Image Processing,"

IEEE Int'l Carnahan Conf. on Security Technology, pp. 200-207, October 2003. Two virtual base lines are utilized to determine the direction of the movement of the people. Thus, there is a need to track people from first line to the second and these lines cannot be too close in the proposed scheme. However, image mergers and splits that occur on or around the virtual lines can cause tracking and counting difficulties.

Although using stereo or multiple cameras can provide additional information about object heights and the structure of the environment, it does not provide a solution to the people counting problems that arise using only a single camera.

SUMMARY OF THE INVENTION

The present invention provides entity monitoring techniques and, more particularly, automatic and robust people counting techniques which employ a hierarchical tracking method which manages image mergers and splits and requires only a single camera.

For example, in one aspect of the present invention, a method of tracking entities using a single overhead camera is provided. A foreground region is detected in a video frame of the single overhead camera corresponding to one or more entities. It is determined if the foreground region is associated with an existing tracker. It is determined if the detected foreground region is the result of at least one of a merger of two or more smaller foreground regions having corresponding existing trackers and a split of a larger foreground region having a corresponding existing tracker when the detected foreground region is not associated with an existing tracker. The detected foreground region is tracked via at least one existing tracker when the foreground region is associated with an existing tracker and the foreground region is the result of at least one of a merger and a split.

For single-person cases or for multiple people moving together without any splits, a newly developed and fast foreground region tracking method is used. To manage interactions among people, specifically merge and split cases, in a more thorough and reliable way, the system has a novel approach of using a mean shift tracking algorithm. Using the developed foreground region tracker in general cases, and employing the mean shift tracking only in the case of mergers and splits saves power and makes the system fast and efficient.

The novelties of the embodiments of the present invention enable the learning of the interval for the size of a single person automatically, the using of a single virtual entry/exit line, and thus detecting the entry/exit events in shorter time and minimizing the effects of appearance changes, and the using of a simpler tracker when a single person is moving, and employing mean shift tracking in the case of mergers and splits to resolve them in a more thorough and reliable way.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using exemplary data processing system architecture. It should be understood, however, that the invention is not limited to use with any particular system architecture. The invention is instead more generally applicable to any system in which it is desirable to track the movement of entities, particularly people, for counting purposes.

Figure 1:
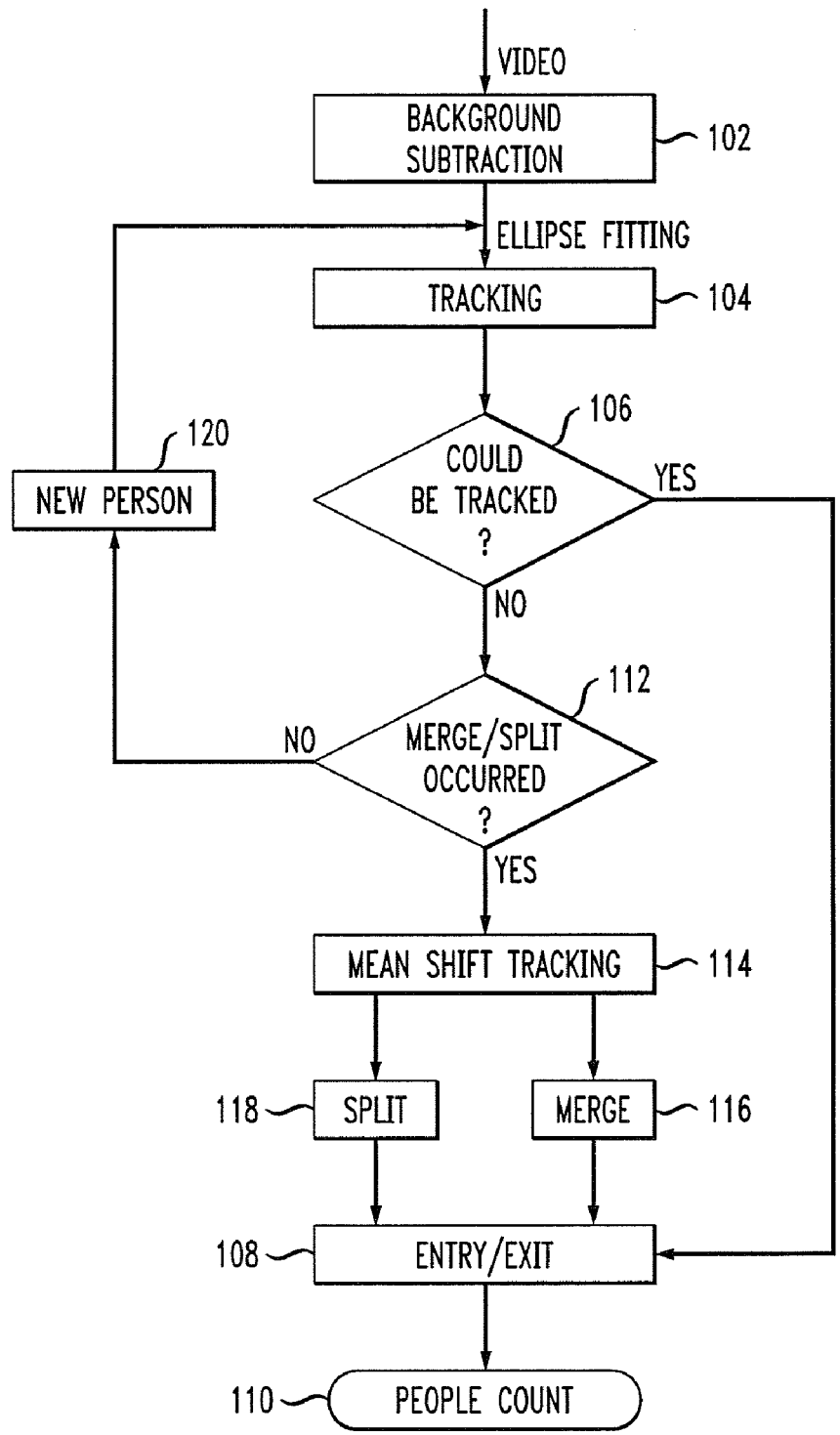
FIG. 1 is a flow diagram illustrating a people tracking and counting methodology, according to an embodiment of the present invention.

Referring initially to FIG. 1, a flow diagram illustrates a people tracking methodology, according to an embodiment of the present invention. The methodology begins in block 102, where video of a specified area, or region of interest (ROI), is received, and moving people in the video are detected utilizing a background subtraction technique. The system assumes that all moving objects are people. After background subtraction, a moving person is represented as a foreground region in a mask of a video frame, and an ellipse is fitted around the pixels of the foreground region. An improved foreground region may then be created by filling all empty pixels within the ellipse, allowing holes that may have resulted from background subtraction to be filled. If this improved foreground region satisfies specific criteria it may be utilized in the tracking process, otherwise the original foreground region is used. The specific criterion for determining whether an original or an improved foreground region is utilized is described in more detail below with regard to FIG. 5.

The methodology of the present invention initiates a foreground region tracking process to track the direction of the foreground region in block 104. In block 106, it is determined whether it is possible to track the foreground region. More specifically, it is determined whether a tracker exists that corresponds to the foreground region. If the foreground region is able to be tracked by a corresponding tracker, the entering or exiting of the foreground region to or from the ROI is detected in block 108 when a foreground region passes a virtually defined entry/exit line. In block 110, people are counted based on the entry or exit of the foreground region from the ROI, terminating the methodology. The number of people is determined by the size, or number of pixels, of the foreground region that is entering or exiting the ROI. The person-size bounds defining the interval for the size of a single person are defined in greater detail below, with regard to FIG. 4.

If a foreground region is not able to be matched to an existing tracker or if an existing tracker is unable to locate its corresponding foreground region, it is determined whether a foreground region merger or split occurred in block 112. If it is determined that a merger or a split occurred, a mean shift tracker is activated in block 114 to determine whether a merger 116 of two or more foreground regions into a single larger foreground region occurred, or a split 118 of a single foreground region into two or more smaller foreground regions occurred. A more detailed description of splits and mergers is provided below with regard to FIG. 9. The methodology then proceeds to blocks 108 and 110 where a number of people entering or exiting is determined based on whether the now identified foreground regions are entering or exiting the ROI, terminating the methodology.

When it is determined that a merger or split did not occur, the unidentified foreground region is considered a new foreground region, representing one or more new people in block 120. A new tracker is defined that corresponds to this new foreground region. The methodology then returns to block 104 where the foreground region tracking process begins again with the new foreground region, which is now able to be identified with a corresponding tracker.

Figure 2:
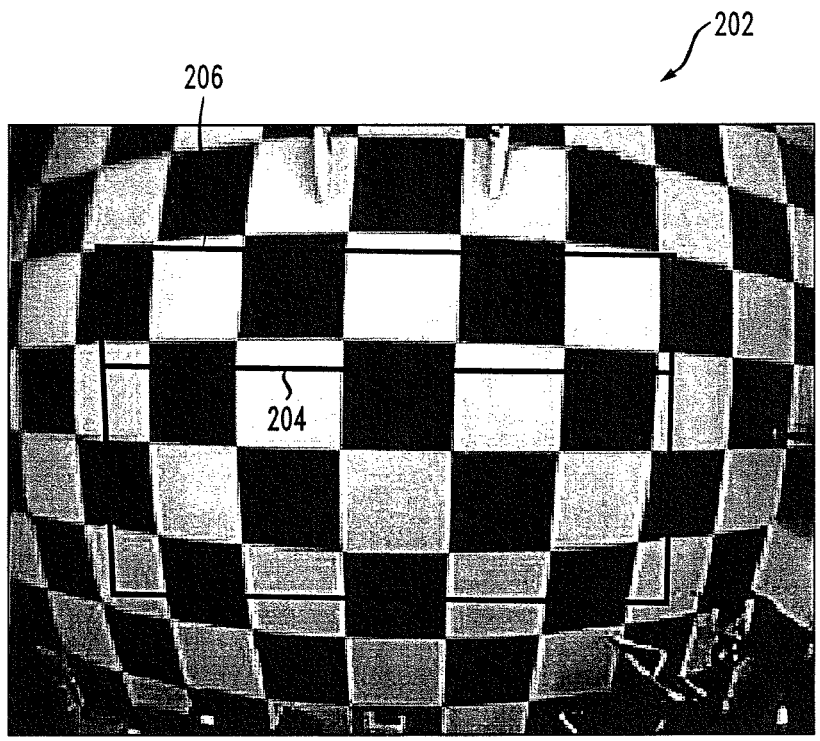
FIG. 2 is a video frame illustrating a region of interest, according to an embodiment of the present invention.

Referring now to FIG. 2, a video frame illustrates an overhead camera view with a marked ROI, according to an embodiment of the present invention. A user is presented with a graphical interface on which the camera view 202 is displayed. The system allows the user to define an ROI 206 in camera view 202. Only those people who pass through ROI 206 in this view are tracked and may be counted. The user also defines an entry/exit line 204 and the side of line 204 where the entry/exit is located. When a foreground region crosses line 204 in accordance with the methodology of the present invention, a corresponding counter, entry or exit, will be incremented by the number of people forming that foreground region, according to the direction the foreground region is moving.

Figure 3:
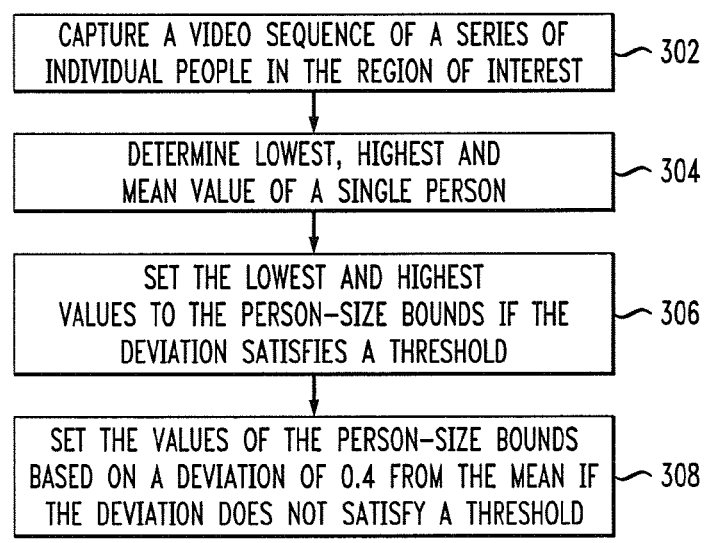
FIG. 3 is a flow diagram illustrating a person-size bounds determination methodology, according to an embodiment of the present invention.

Referring now to FIG. 3, a flow diagram illustrates a person-size bounds determination methodology, according to an embodiment of the present invention. The upper and lower boundaries for the size of a single person are established through this methodology, and automatically learned in the system. After the camera is in place above the ROI, the methodology begins in block 302, where a video sequence, for example, of approximately 3 to 5 minutes in length, is captured in which different people proceed in and out of the ROI one person at a time. In block 304, the areas of the foreground regions relating to the individual people are saved to determine the lowest, highest and mean value of a single person size from the video. If the deviation of these values meets a specified threshold, the lowest and highest values are set to be the person-size bounds in block 306. If the values do not meet a specified threshold, in block 308, the lower and higher values of the person-size bounds are determined so that they will have equal distance from the mean and a deviation of 0.4 (after normalization of the values by the mean value). By learning the upper and lower bounds from this video sequence, the necessary tolerance for different effects, such as clothing, carried items or differing heights, is achieved in the person size interval (PSI).

If this interval is denoted by PSI=[LB UB], where LB denotes the lower boundary and UB denotes the upper boundary, and the mean is defined as $$M = \frac{LB + UB}{2},$$

the deviation, D=M−LB=UB−M. Given that the area of a foreground region is N pixels, the decision about the number of people, P, forming that foreground region is made as follows:

$P=1$, if $M-D \leq N \leq M+D$ $P=2$, if $M+D \leq N \leq 2M+0.5D$ $P=3$, if $2M+0.5D \leq N \leq 3M+0.8D$ $P=4$, if $3M+0.8D \leq N \leq 4M+D$ $P=5$, if $4M+D \leq N \leq 5M+1.2D$ (1)

As shown in equation (1), by using M and D, the intervals for the sizes of foreground regions composed of 2, 3, 4 and 5 people are determined by algorithms based on experimental studies.

Figure 4:
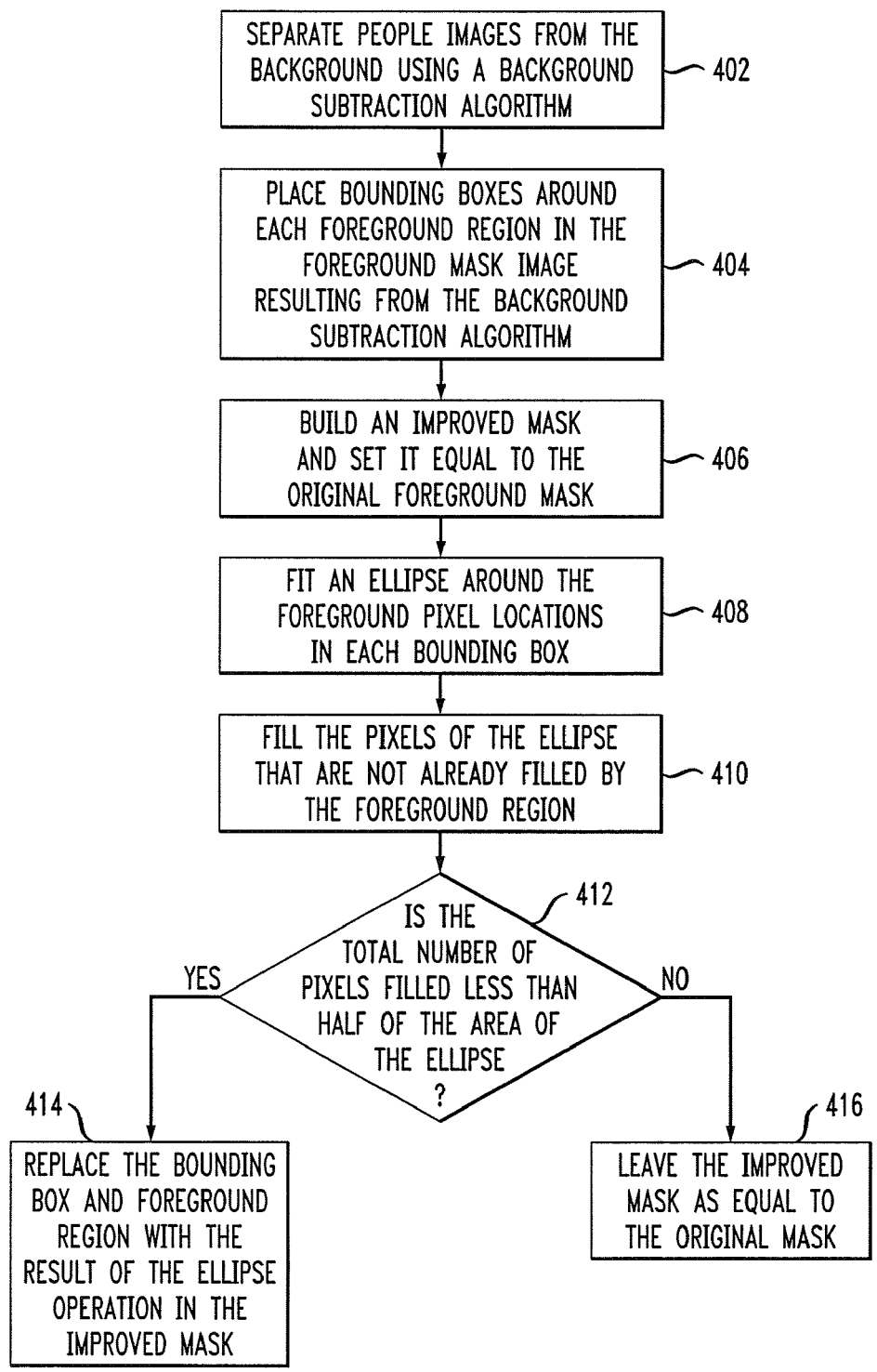
FIG. 4 is a flow diagram illustrating a mask creation methodology, according to an embodiment of the present invention.

Referring now to FIG. 4, a flow diagram illustrates a mask creation methodology, according to an embodiment of the present invention. In block 402, images of people in the current video frame within the ROI are separated from the static background by using a background subtraction method. The background subtraction method is an improved version of the mixture of Gaussians, see for example C. Stauffer et al., "Adaptive Background Mixture Models for Real-Time Tracking," IEEE Int'l Conf. on CVPR, Vol. 2, June 1999. In this mask, background pixels are set to 0, and foreground pixels are set to 1, 2 . . . n for n different foreground regions respectively. In block 404, bounding boxes are placed around each foreground region in the foreground mask image resulting from the background subtraction algorithm.

In order to fill the possible holes in the foreground region, which may have occurred as a result of the background subtraction technique, and to learn a more reliable color distribution for the foreground regions, a new mask is defined in block 406, which is termed an improved mask and set equal to the original mask. An ellipse is then fit around the foreground pixel locations in each bounding box in block 408 and pixels in the ellipse that are not already filled, or set to 1, 2, . . . n, are filled in block 410. It is determined whether the total number of pixels filled is less than half of the area of the ellipse in block 412. If the total number of filled pixels is less than half of the area of the ellipse, the improved mask is set equal to the output of the ellipse operation and a new boundary box is created around the foreground region in block 414. If the total number of filled pixels is not less than half the area of the ellipse, the improved mask is left unchanged as equal to the original mask in block 416.

Figure 5:
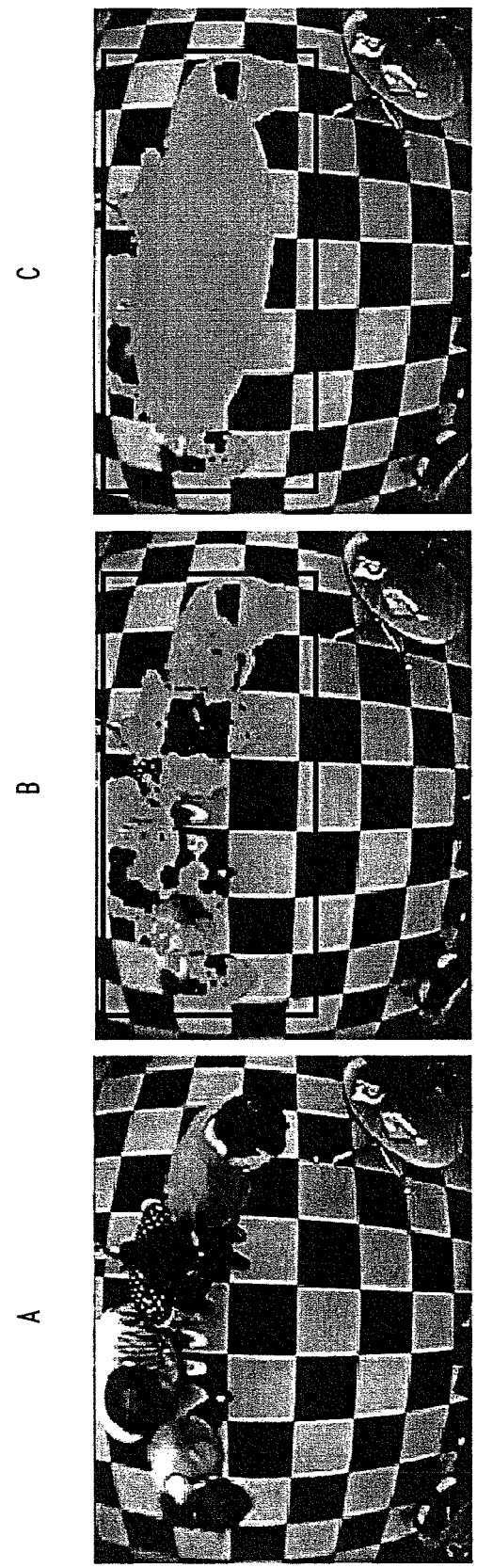
FIG. 5 is a video frame and corresponding masks illustrating mask determination, according to an embodiment of the present invention.

The reason for making the area check in block 412 of FIG. 4 is illustrated in FIG. 5, which shows a video frame and corresponding masks, according to an embodiment of the present invention. The video frame of FIG. 5A illustrates the video fed to the system. An original mask is shown in FIG. 5B with a bounding box around the foreground region. The result of the ellipse fitting and pixel fill process is shown in FIG. 5C. However, a large background region is joined into the mask as a result of the fill operation, which is not less than half the area of the ellipse; therefore the original mask of FIG. 5B is set as the improved mask and used to learn the color distribution of the foreground pixels and in the tracking methodology of the embodiments of the present invention.

Figure 6:
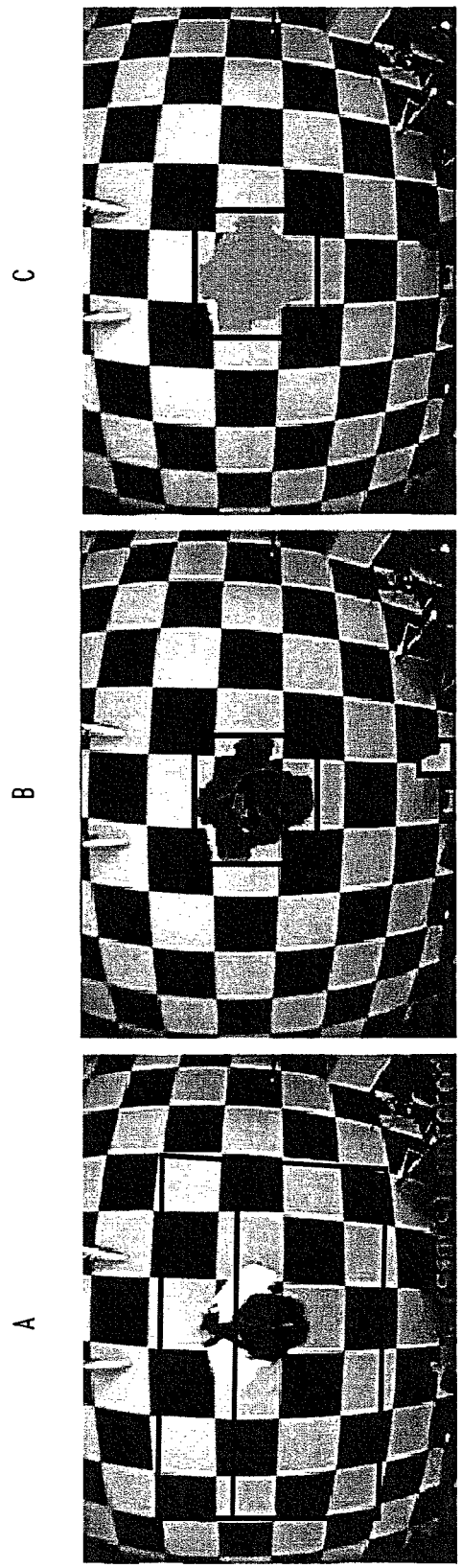
FIG. 6 is a video frame and corresponding masks illustrating mask determination, according to an embodiment of the present invention.

The area check is also illustrated in FIG. 6, where a video frame and corresponding masks are illustrated, according to an embodiment of the present invention. The video frame of FIG. 6A illustrates the video fed to the system. An original mask is shown in FIG. 6B with a bounding box around the foreground region. The result of the ellipse fitting and pixel fill process is shown in FIG. 6C. In the embodiment shown in FIG. 6, a small background region is joined into the mask as a result of the fill operation, which is less than half the area of the ellipse; therefore the improved mask of FIG. 6C is used to learn the color distribution of the foreground pixels and in the tracking methodology of the embodiments of the present invention.

Figure 7:
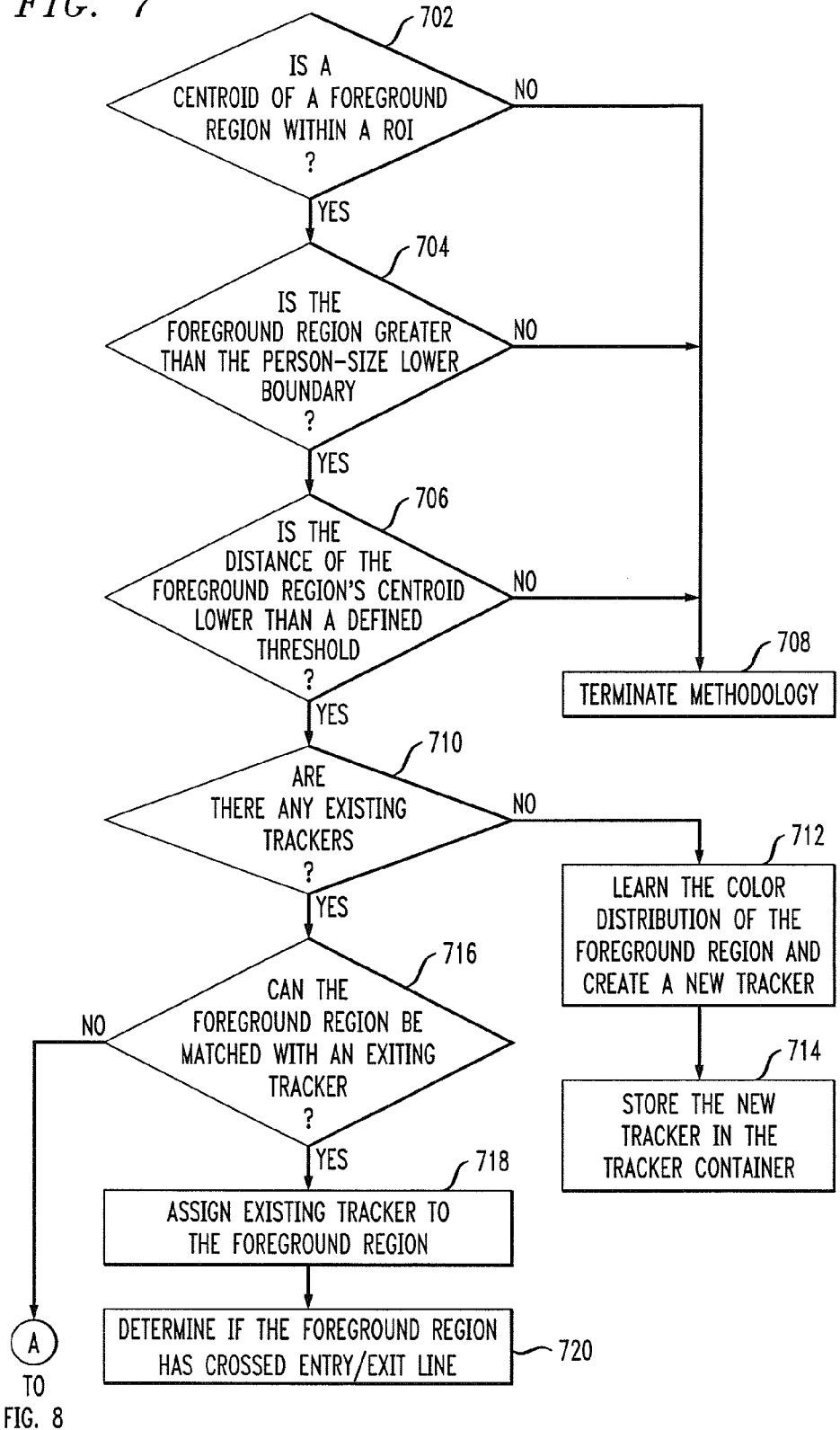
FIG. 7 is a flow diagram illustrating a tracking methodology, according to an embodiment of the present invention.

Referring now to FIG. 7, a flow diagram illustrates a tracking methodology, according to an embodiment of the present invention. This may be considered a detailed description of blocks 104, 106 and 108 of FIG. 1. Once the proper mask for the foreground region is established, it is determined whether the centroid of the foreground region is within the ROI in block 702, and whether the area of the foreground region, or total number of pixels, is greater than the lower boundary of the automatically learned person-size interval in block 704. The determination of a lower boundary is illustrated in FIG. 3. If these conditions are satisfied, it is determined if the distance of the foreground region's centroid to the entry/exit line is lower than a threshold, in block 706. If the conditions of blocks 702, 704 and 706 are not satisfied, the methodology terminates in block 708.

If the distance to the entry/exit line is lower than a predefined threshold, meaning that the person has come close enough to the entry/exit line, it is determined if there are existing, or defined, trackers in block 710. If there are no existing trackers, the color distribution of the foreground region is learned, and a new tracker is created for the foreground region, in block 712. After a new tracker is created for a new foreground region, it is stored in a tracker container in block 714. In addition, a label is given to the foreground region, and the centroid of the foreground region is stored as the initial centroid.

The system in this embodiment of the present invention has two containers for trackers. A first container, the tracker container, holds the trackers that track the foreground regions that are moving in the ROI and have not yet crossed the entry/exit line. The second container, the already-counted tracker container, holds trackers that keep model distribution information of the already-counted people. The already-counted tracker container is utilized when a foreground region that is close to the entry/exit line merges with an already-counted foreground region before its color distribution can be learned. Since information regarding the color distribution of the already-counted foreground region is saved in the already-counted tracker container, the already-counted foreground region may claim its region within the larger merged foreground region, after using mean shift, and the remainder of the larger merged foreground region is used to learn the color distribution of the new foreground region.

Returning to the methodology of FIG. 7, if there are defined trackers in the tracker container, it is determined whether the foreground region can be matched with any of the existing trackers in block 716. A simple matching criteria is used which is based on the boundary box intersection, and the Bhattacharya coefficient which is defined by equation (2), see, for example, D. Comaniciu et al., "Real-Time Tracking of Non-Rigid Objects Using Mean Shift," IEEE Conf. on Computer Vision and Pattern Recognition (CVPR '00), South Carolina, Vol. 2, 142-149, 2000.

$$\rho(y) = \rho[p(y), q] = \int \sqrt{p_z(y) q_z} dz. \quad (2)$$

In equation (2), z is the feature representing the color of the target model and is assumed to have a density function $q_z$ while $p_z(y)$ represents the feature distribution of the improved mask centered at location y. The Bhattacharya coefficient is derived from the sample data by using:

$$\hat{\rho}(y) \equiv \rho[\hat{p}(y), \hat{q}] = \sum_{u=1}^{m} \sqrt{\hat{p}_u(y) \hat{q}_u} \quad (3)$$

where $\hat{q} = \{\hat{q}_u\}_{u=1 \ldots m}$, and $\hat{p}(y) = \{\hat{q}_u\}_{u=1 \ldots m}$ are the discrete densities estimated from the m-bin histogram of the model and the candidate foreground regions respectively. These densities are estimated by using the color information at the nonzero pixel locations of the improved mask, and the kernel profile, see, for example, D. Comaniciu et al. In block 718, the foreground region is assigned to the tracker which results in the highest Bhattacharya coefficient and is assigned the label of that tracker. If the foreground region is not able to be matched to an existing tracker, the methodology continues in FIG. 8.

In block 720, it is determined if the foreground region has already crossed the entry/exit line of the ROI. The centroid of the foreground region and the initial centroid of its tracker are inserted into an entry/exit line equation to determine if the foreground region has crossed the line, increasing corresponding entering and exiting counters when necessary. The tracker of this foreground region is then removed from the tracker container and placed into the already-counted tracker container. The entry/exit event is detected in a very short period of time, i.e. the tracking starts when the foreground region is close to the entry/exit line and the direction of the movement can be determined as soon as the foreground region crosses the line. If the foreground region has not crossed the line yet, its model distribution is updated. Already counted foreground regions that are in the ROI are tracked the same way by using this fast and efficient foreground region tracker.

Figure 8:
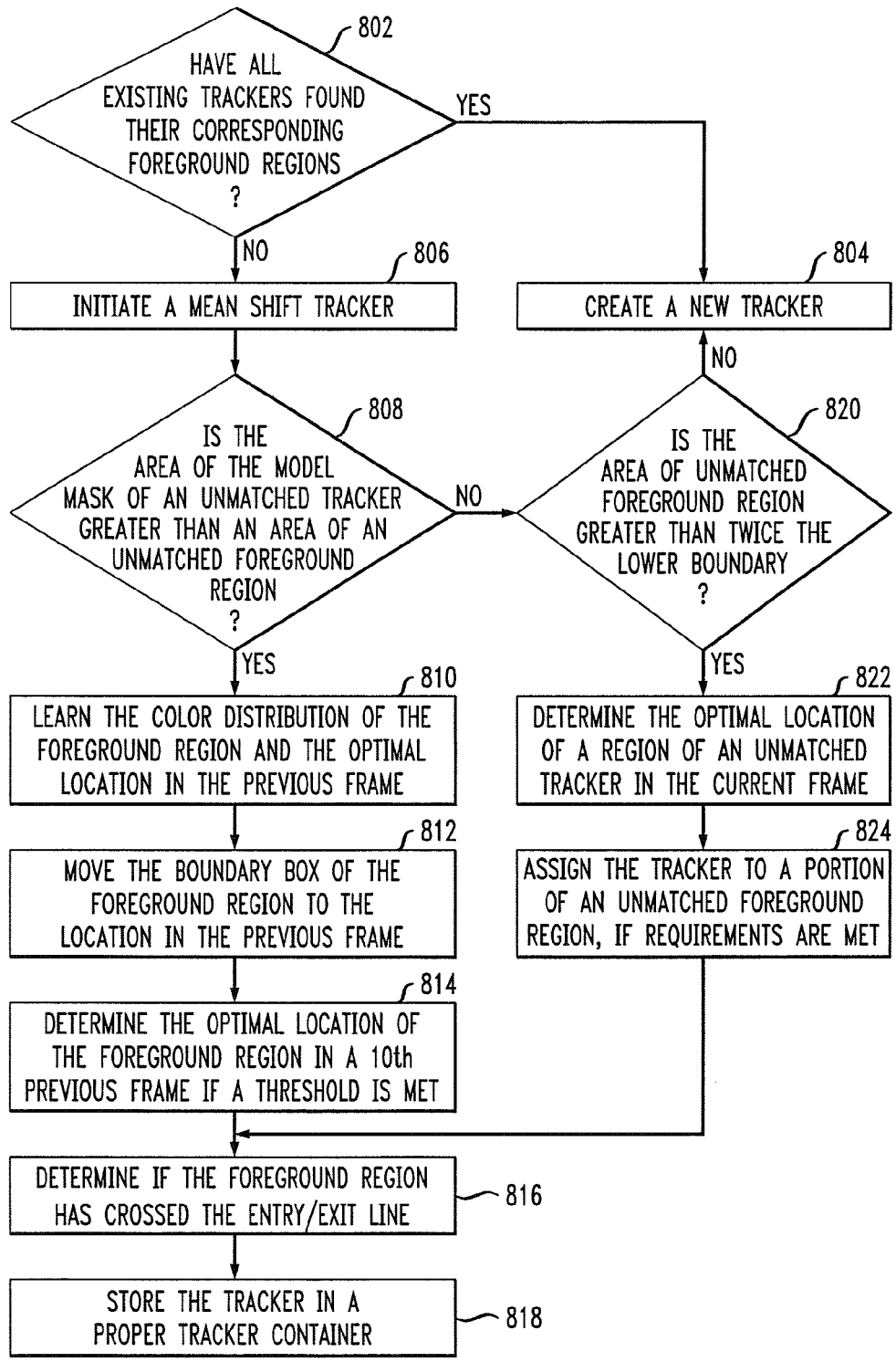
FIG. 8 is a flow diagram illustrating a merge and split determination methodology, according to an embodiment of the present invention.

Referring now to FIG. 8, a flow diagram illustrates a merge and split determination methodology, according to an embodiment of the present invention. This may be considered a detailed description of blocks 114 and 116 of FIG. 1. If a foreground region cannot be matched to any of the existing trackers in the tracker container, there are three possible scenarios: 1) a merger has occurred; 2) a split has occurred; or 3) a new foreground region has entered the ROI. First, it is determined if all of the existing trackers have found their matches in block 802 using the boundary box intersection and Bhattacharya coefficient criteria. If the trackers have found their corresponding foreground regions, a new tracker is created in block 804. If one or more of the trackers have not found their corresponding foreground regions in the ROI, a merger or split has occurred. A mean shift tracker is initiated in block 806 when merger and split situations need to be resolved, see, for example, D. Comaniciu et al. For every tracker in the tracker container that could not find its match, it is determined in block 808 whether the area of the model mask of that tracker is greater than an area of unmatched foreground region plus LB/3. This is a check to determine if a split has occurred. The LB/3 is added to save time and power by avoiding a split check each time the model mask area of the tracker is slightly larger than the area of the unmatched foreground region. The tracker under consideration is denoted by $T_c$.

If the area of the mask is greater than the area of the unmatched foreground region plus LB/3, the color distribution of the unmatched foreground region is learned and the optimal location of this foreground region is found in the previous frame by using mean shift in block 810. The boundary box of the unmatched foreground region is moved to this location in the previous frame in block 812, and is denoted by $BB_{f-1}$, where f is the current frame number. It is determined whether the Bhattacharya coefficient obtained from the mean shift step is larger than a predefined threshold and if there is large enough overlap between the model mask of the tracker examined ($T_c$) and $BB_{f-1}$, which signals that a split has occurred.

The optimal location of the foreground region is then found in frame f–10 by meanshift tracking in block 814. By using the current centroid of the foreground region and its centroid in frame f–10, it is determined if this foreground region has already crossed the entry/exit line in block 816. In block 818, the tracker for the foreground region is stored in the proper container. If the foreground region has already crossed the entry/exit line, the foreground region tracker created for this foreground region is put into the already-counted tracker container. If it has not passed the line, the foreground region tracker created for this foreground region is placed into the tracker container.

Similarly, another foreground region, which can not be matched to any of the existing trackers, will claim the remaining part of the model mask of $T_c$. Then, after new trackers are created for these smaller foreground regions, the existing tracker, $T_c$, will be removed from the tracker container.

Figure 9:
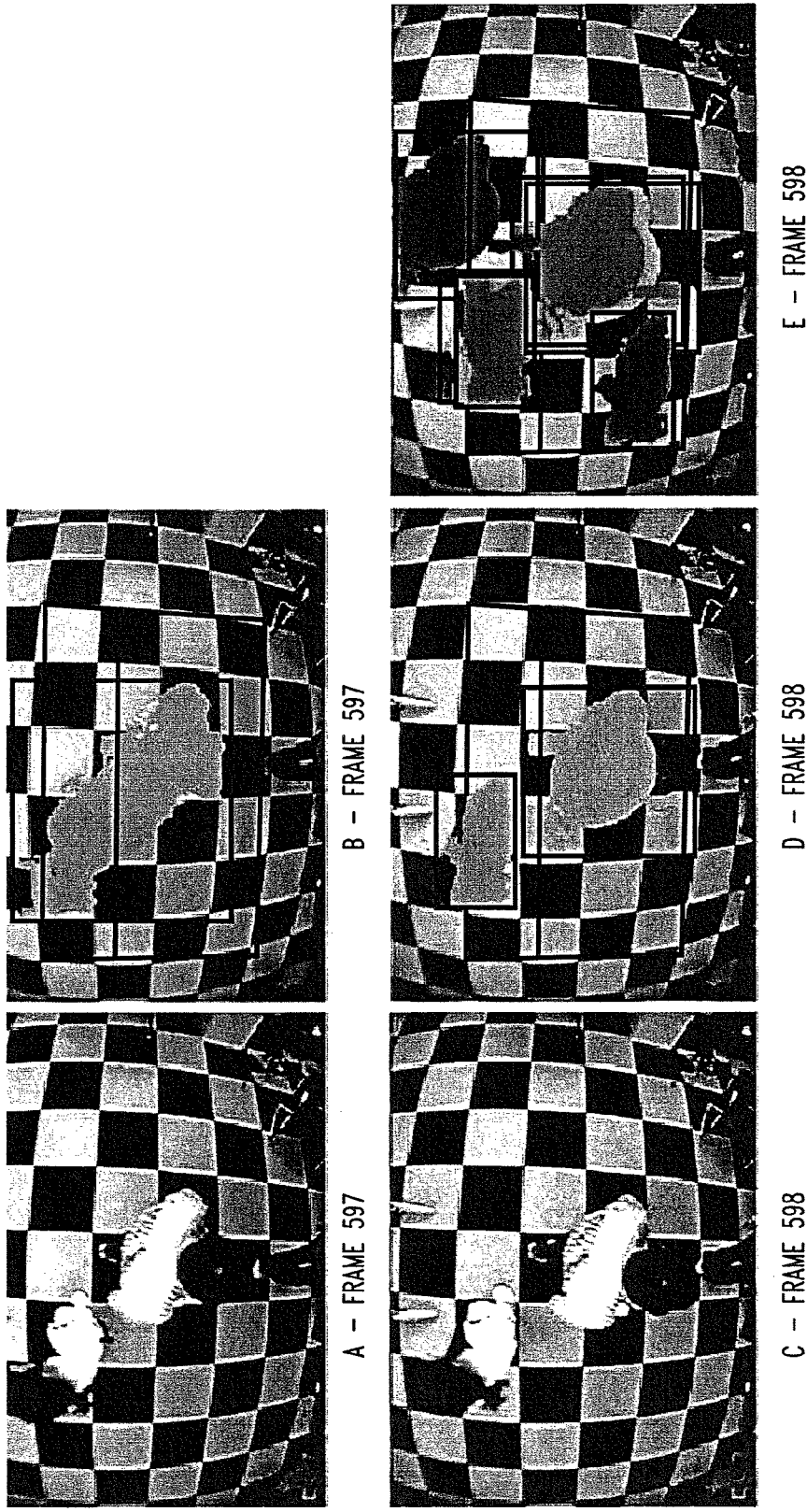
FIG. 9 is a video frame and corresponding masks illustrating a foreground region split, according to an embodiment of the present invention.
Figure 10:
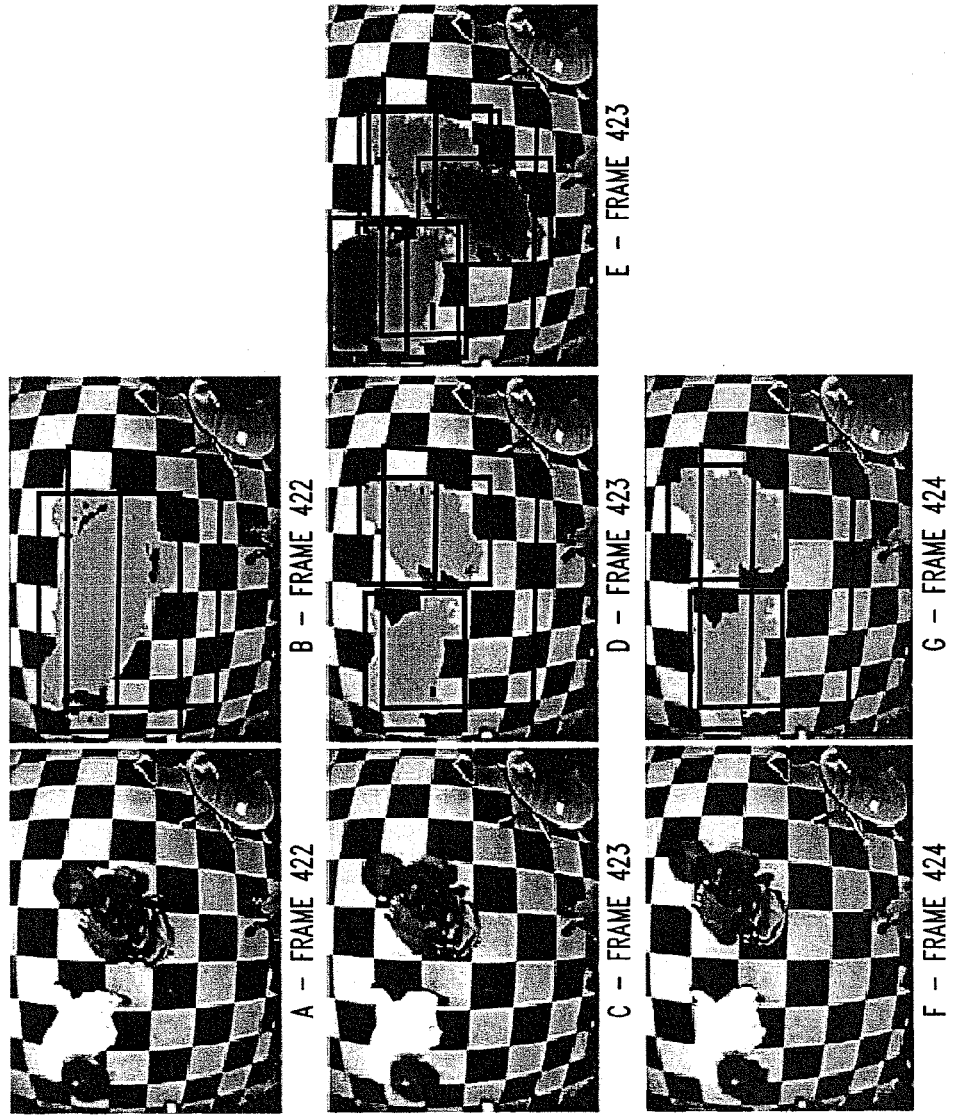
FIG. 10 is a video frame and corresponding masks illustrating a foreground region split, according to an embodiment of the present invention.

FIGS. 9 and 10 illustrate examples of the system managing split cases, according to an embodiment of the present invention. FIGS. 9A and 9C show frames 597 and 598, respectively. FIGS. 9B and 9D illustrate the masks resulting from frames 597 and 598. As illustrated in FIG. 9D a split has occurred in frame 598. A single foreground region in the mask of FIG. 9B has split into two foreground regions in the mask of FIG. 9D. FIG. 9E illustrates the current locations of the foreground regions, the locations of the foreground regions in the previous frame, and locations of the foreground regions in the 10th previous frame. These previous locations are found using the mean shift algorithm. The methodology is then able to define trackers for the foreground regions and determine whether the foreground regions have already crossed the entry/exit line of the ROI.

Similarly, FIGS. 10A, 10C and 10F show frames 422, 423 and 424, respectively. As illustrated in FIG. 10D a split occurs in frame 423, and remains split in frame 424 as illustrated in FIG. 10G. FIG. 10E illustrates how the initial centroid of a foreground region, which appears after a split, is found by the system.

The methodology of this embodiment of the present invention which manages mergers is less cumbersome than of managing splits as there is no need to track back through the 10 previous frames. Referring back to FIG. 8, it is determined if the area of an unmatched foreground region is greater than 2×LB in block 820. If the area is greater than this threshold, the unmatched foreground region is a candidate case for a merger. If this requirement is not met, neither a merger nor a split has occurred and a new tracker is created in block 804.

For every tracker in the tracker container that could not find its match, its optimal location in the current frame is found by using the mean shift algorithm in block 822. The tracker under consideration is again denoted by $T_c$. If the Bhattacharya coefficient obtained is greater than a predefined threshold, and if there is enough overlap between the unmatched larger foreground region and the pixels in the boundary box of the $T_c$, after it has been moved to its found location in current frame, then $T_c$ claims that part of the bigger foreground region in block 824. It is then determined whether the foreground regions have crossed the entry/exit line and the tracker is properly stored in blocks 816 and 818.

Figure 11:
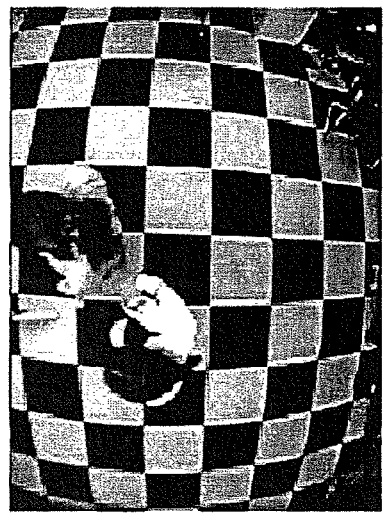
FIG. 11 is a video frame and corresponding masks illustrating a foreground region merger, according to an embodiment of the present invention.
Figure 11:
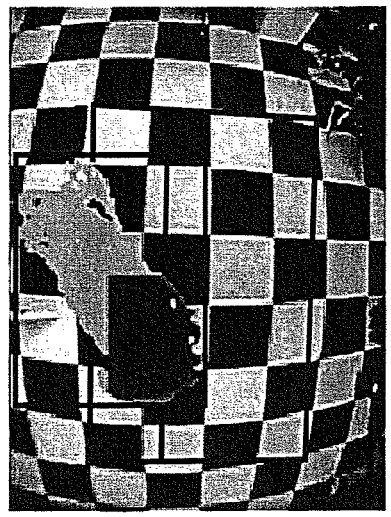
Figure 11:
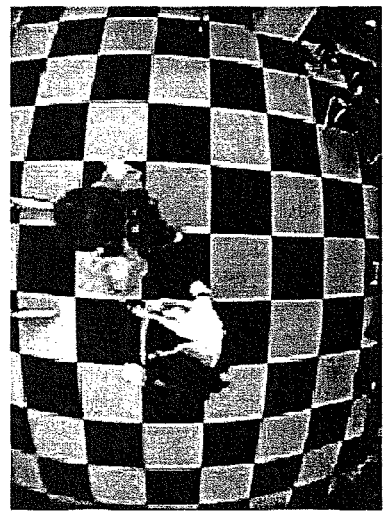
Figure 11:
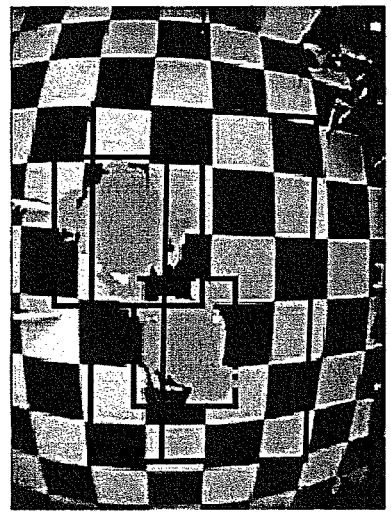
Figure 12:
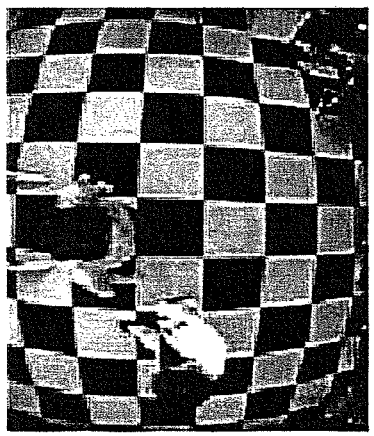
FIG. 12 is a video frame and corresponding masks illustrating a foreground region merger, according to an embodiment of the present invention.
Figure 12:
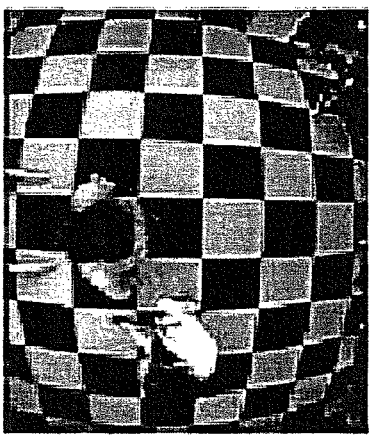
Figure 12:
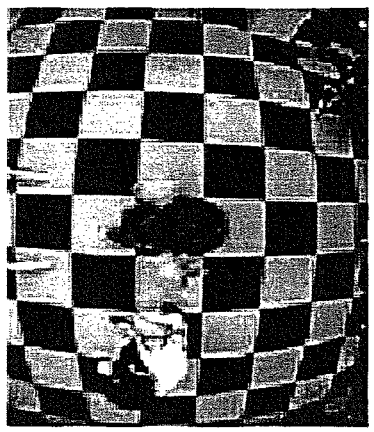
Figure 12:
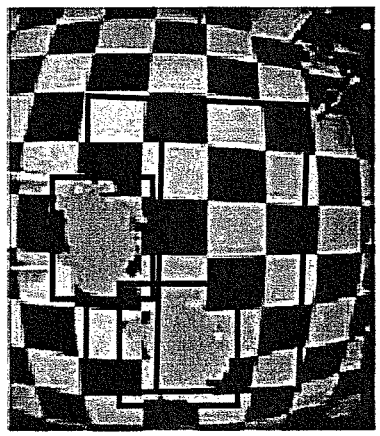
Figure 12:
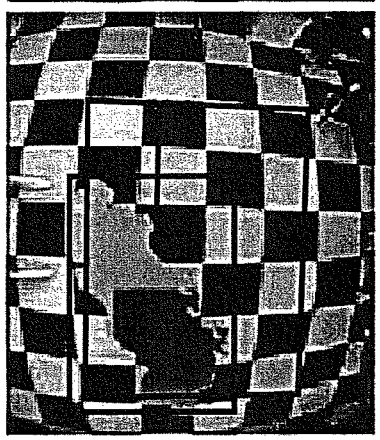
Figure 12:
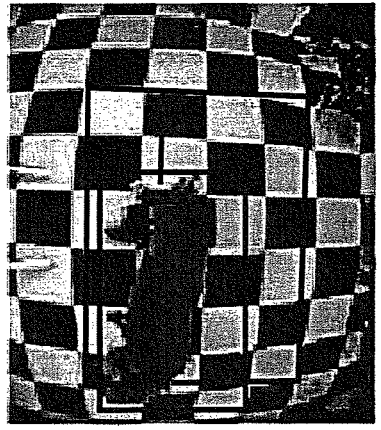

FIGS. 11 and 12 illustrate examples of the system managing mergers, according to an embodiment of the present invention. FIG. 11A shows frame 410 of a video feed to the system. FIG. 11B shows a mask of frame 410 having two separate foreground regions that may be tracked. FIG. 11C shows frame 413 of a video feed to the system. In FIG. 11D, a mask of frame 413 is shown having a single foreground region. The two foreground regions from the mask of frame 410 have merged into the single foreground region in the mask of frame 413. Using the methodology, according to an embodiment of the present invention, a foreground region with label 41 in FIG. 11D claims its region in larger merged foreground region, and is detected as having already crossed the line.

Similarly, FIGS. 12A, 12C and 12E show frames 803, 804 and 808, respectively of a video feed to the system. FIG. 12B shows a mask of frame 803 having two separate foreground regions that may be tracked. FIG. 12D shows a mask of frame 804 having a single foreground region. The two foreground regions from frame 803 have merged into the single foreground region in the mask of frame 804. FIG. 12F shows a mask of frame 808 in which the two foreground regions remain merged. Using the methodology, according to an embodiment of the present invention, each of the two original foreground regions claim their portion of the larger merged foreground region.

If a foreground region cannot be matched to any of the existing trackers in the tracker container, and if no merge or split case has been found after checking unmatched trackers, a new foreground region has entered the ROI. Before learning the color distribution of this new foreground region, it is determined whether the foreground region has been formed by the merger of an already-counted foreground region with a new foreground region. If there was no merger between an already-counted foreground region and a new foreground region, then the color distribution of this foreground region is learned. If there was a merger between an already-counted foreground region and a new foreground region, the tracker of the already-counted foreground region claims its part of the larger foreground region, and the color distribution for the portion of the larger foreground region is learned from the unclaimed part of the unmatched foreground region.

When the centroid of a foreground region is outside the ROI and is close enough to one of the boundaries, it is checked if this foreground region can be matched to any of the trackers in the already-counted tracker container. This is done by using the simpler foreground region tracker first. If a match cannot be found this way, then the mean shift tracker is activated. When a matching tracker is found, it is removed from the container.

The system also performs cleaning and empties both tracker containers when the ROI is empty. Thus, unless people tend to accumulate in the ROI, the number of trackers in the tracker containers will not be large, making the matching process fast and efficient.

Figure 13:
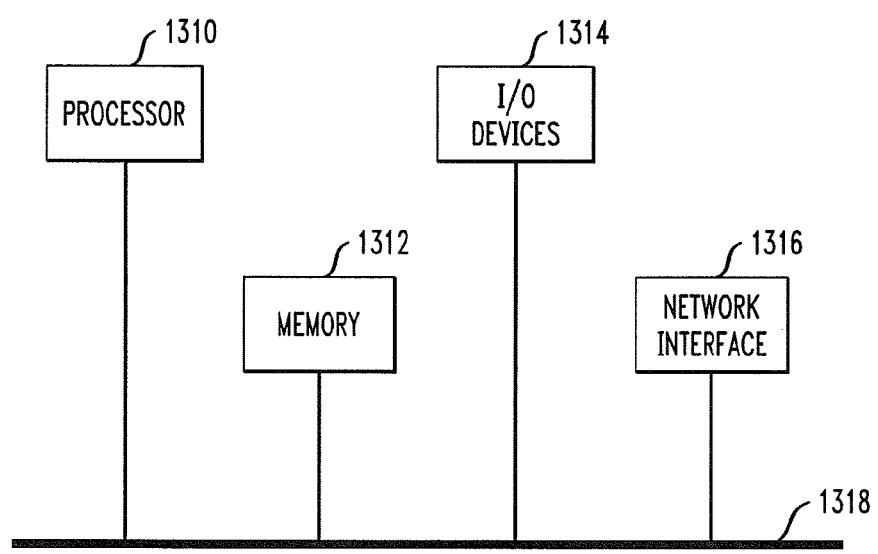
FIG. 13 is a diagram illustrating an illustrative hardware implementation of a computing system in accordance with which one or more components/methodologies of the present invention may be implemented, according to an embodiment of the present invention.

Referring now to FIG. 13, a block diagram illustrates an exemplary hardware implementation of a computing system in accordance with which one or more components/methodologies of the invention (e.g., components/methodologies described in the context of FIGS. 1-12) may be implemented, according to an embodiment of the present invention.

As shown, the computer system may be implemented in accordance with a processor 1310, a memory 1312, I/O devices 1314, and a network interface 1316, coupled via a computer bus 1318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, video camera, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

For example, a graphical user interface may illustrate a video frame and corresponding masks and counters, according to an embodiment of the present invention. Numbers for entering and exiting people may be displayed in two separate counters and in different colors. A message may also be displayed on the video frame indicating that a person has entered or exited the ROI.

An automatic people tracking and counting system has been described. The system requires only one overhead camera and performs automatic bi-directional counting of entities. Entities may be defined as any moving object through the ROI, and are described in the illustrative embodiments herein as people.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of tracking entities using a single overhead camera comprising the steps of:
   detecting a foreground region in a video frame of the single overhead camera corresponding to one or more entities;
   determining if the foreground region is associated with an existing tracker;
   determining whether the detected foreground region is the result of at least one of a merger of two or more smaller foreground regions having corresponding existing trackers and a split of a larger foreground region having a corresponding existing tracker when the detected foreground region is not associated with an existing tracker; and
   tracking the detected foreground region via at least one existing tracker when the foreground region is at least one of associated with an existing tracker and the result of at least one of a merger and a split;
   wherein the step of detecting a foreground region comprises the steps of:
      differentiating foreground pixels and background pixels to create a first foreground region;
      fitting an ellipse around the pixels of the first foreground region;
      filling the pixels in the ellipse around the first foreground region to create a second foreground region;
      determining whether the number of pixels filled is less than half of the pixels within the ellipse;
      using the second foreground region as the foreground region when the number of pixels filled is less than half of the pixels within the ellipse; and
      using the first foreground region as the foreground region when the number of pixels filled is not less than half of the pixels within the ellipse wherein the above steps are performed via a processor.

2. The method of claim 1, further comprising the steps of:
   defining a new tracker when the detected foreground region is not the result of at least one of a merger and a split; and
   tracking the detected foreground region via the new tracker.

3. The method of claim 1, wherein the step of detecting a foreground region comprises the step of determining a lower boundary and an upper boundary for entity size.

4. The method of claim 3, wherein the step of determining a lower boundary and an upper boundary comprises the steps of:
   capturing a video sequence of a series of individual entities with the single overhead camera;
   determining a lowest size value, a highest size value, and a mean size value of the series of entities;
   setting the lowest size value to the lower boundary and the highest size value to the upper boundary when the lowest size value, the highest size value and the mean size value satisfy a deviation threshold; and
   setting the lower boundary and the upper boundary based on a deviation of approximately 0.4 from the mean size value when the lowest size value, the highest size value and the mean size value do not satisfy a deviation threshold.

5. The method of claim 1, further comprising the steps of:
   defining a region of interest in the video frame of the single overhead camera;
   defining an entry/exit line in the region of interest; and
   defining an entry/exit side of the entry/exit line.

6. The method of claim 5, further comprising the steps of:
   detecting when the foreground region has crossed the defined exit/entry line; and
   tallying the number of entities that cross the entry/exit line based on an entity size lower boundary, an entity size upper boundary and tracking direction of the foreground region.

7. The method of claim 1, wherein the step of detecting a foreground region comprises the steps of:
  detecting a centroid of the foreground region within a region of interest in the video frame;
  determining if an area of the foreground region is greater than an entity size lower boundary, when the centroid of the foreground region is within the region of interest;
  continuing the tracking methodology when the area of the foreground region is not less than an entity size lower boundary; and
  terminating the tracking methodology when the area of the foreground region is less than an entity size lower boundary.

8. The method of claim 1, wherein the step of determining whether the detected foreground region is the result of at least one of a merger and a split comprises the steps of:
  determining whether each existing tracker has a corresponding foreground region;
  performing a foreground region split check when each existing trackers does not have a corresponding foreground region;
  performing a foreground region merge check when the foreground region split check fails; and
  creating a new tracker when at least one of each existing tracker has a corresponding foreground region and the foreground region merge check fails.

9. The method of claim 8, wherein the step of performing a foreground region split check comprises the step of determining if an area of a mask of an existing unmatched tracker is greater than an area of the detected foreground region combined with one-third an area of an entity size lower boundary.

10. The method of claim 9, further comprising the steps of:
  determining a location of the detected foreground region in a previous frame using a mean shift algorithm;
  moving a boundary box of the detected foreground region to the location in the previous frame; and
  determining that a split has occurred when a coefficient from the mean shift algorithm is larger than a predefined threshold and when there is a substantial overlap between a mask of the existing unmatched tracker and the moved boundary box; and
  associating the existing unmatched tracker with the detected foreground region.

11. The method of claim 8, wherein the step of performing a foreground region merge check comprises the step of determining whether an area of the detected foreground region is greater than twice an area of an entity size lower boundary.

12. The method of claim 11, further comprising the steps of:
  determining a location of an unmatched tracker in a current frame using a mean shift algorithm; and
  determining that a merger has occurred when a coefficient from the mean shift algorithm is greater than a predefined threshold and when there is substantial overlap between the foreground region and the unmatched tracker after being moved to a current frame; and
  associating the unmatched tracker with the detected foreground region.

13. A method of tracking entities using a single overhead camera comprising the steps of:
  detecting a foreground region in a video frame of the single overhead camera corresponding to one or more entities;
  determining if the foreground region is associated with an existing tracker;
  determining whether the detected foreground region is the result of at least one of a merger of two or more smaller foreground regions having corresponding existing trackers and a split of a larger foreground region having a corresponding existing tracker when the detected foreground region is not associated with an existing tracker, wherein the step of determining whether the detected foreground region is the result of at least one of a merger and a split comprises the steps of:
    determining whether each existing tracker has a corresponding foreground region;
    performing a foreground region split check when each existing trackers does not have a corresponding foreground region, wherein the step of performing a foreground region split check comprises the step of determining if an area of a mask of an existing unmatched tracker is greater than an area of the detected foreground region combined with one-third an area of an entity size lower boundary;
    performing a foreground region merge check when the foreground region split check fails; and
    creating a new tracker when at least one of each existing tracker has a corresponding foreground region and the foreground region merge check fails;
  tracking the detected foreground region via at least one existing tracker when the foreground region is at least one of associated with an existing tracker and the result of at least one of a merger and a split;
  determining a location of the detected foreground region in a previous frame using a mean shift algorithm;
  moving a boundary box of the detected foreground region to the location in the previous frame;
  determining that a split has occurred when a coefficient from the mean shift algorithm is larger than a predefined threshold and when there is a substantial overlap between a mask of the existing unmatched tracker and the moved boundary box; and
  associating the existing unmatched tracker with the detected foreground region wherein the above steps are performed via a processor.

14. A method of tracking entities using a single overhead camera comprising the steps of:
  detecting a foreground region in a video frame of the single overhead camera corresponding to one or more entities;
  determining if the foreground region is associated with an existing tracker;
  determining whether the detected foreground region is the result of at least one of a merger of two or more smaller foreground regions having corresponding existing trackers and a split of a larger foreground region having a corresponding existing tracker when the detected foreground region is not associated with an existing tracker, wherein the step of determining whether the detected foreground region is the result of at least one of a merger and a split comprises the steps of:
    determining whether each existing tracker has a corresponding foreground region;
    performing a foreground region split check when each existing trackers does not have a corresponding foreground region;
    performing a foreground region merge check when the foreground region split check fails, wherein the step of performing a foreground region merge check comprises the step of determining whether an area of the detected foreground region is greater than twice an area of an entity size lower boundary; and
    creating a new tracker when at least one of each existing tracker has a corresponding foreground region and the foreground region merge check fails;

tracking the detected foreground region via at least one existing tracker when the foreground region is at least one of associated with an existing tracker and the result of at least one of a merger and a split;
determining a location of an unmatched tracker in a current frame using a mean shift algorithm; and
determining that a merger has occurred when a coefficient from the mean shift algorithm is greater than a predefined threshold and when there is substantial overlap between the foreground region and the unmatched tracker after being moved to a current frame;: and
associating the unmatched tracker with the detected foreground region wherein the above steps are performed via a processor.

* * * * *